M. R. HUBBELL.
Vegetable Cutter.
No. 31,460.            Patented Feb. 19, 1861.
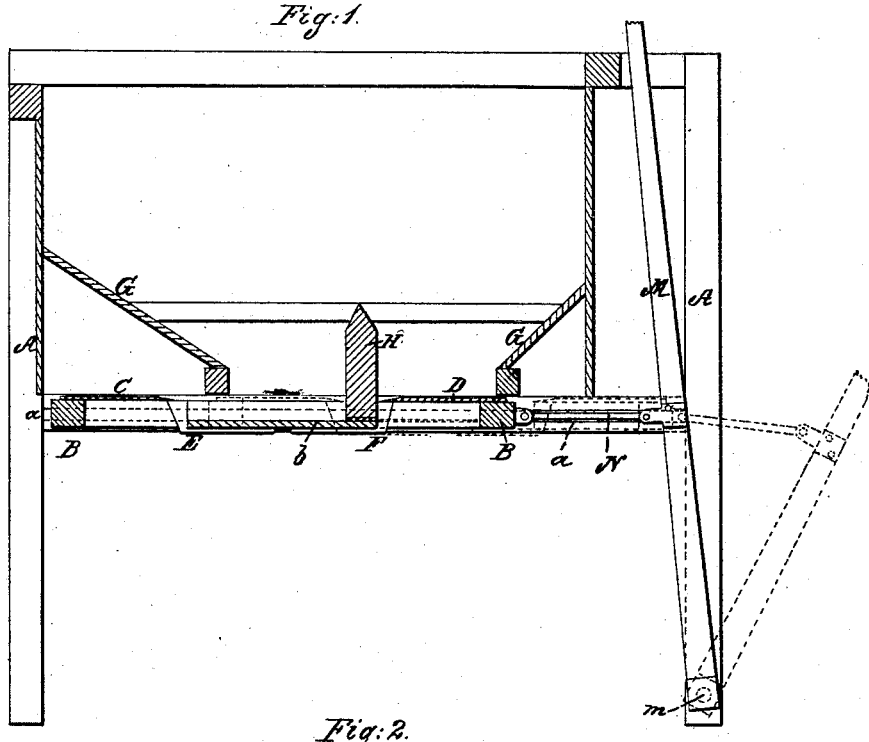
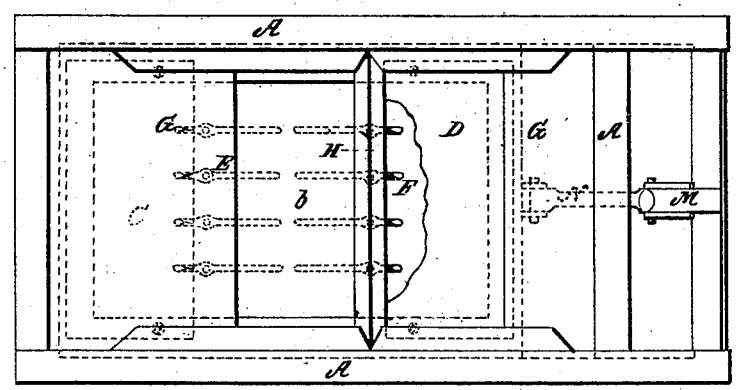

UNITED STATES PATENT OFFICE.

MYRON R. HUBBELL, OF WOLCOTT, VERMONT.

VEGETABLE-CUTTER.

Specification of Letters Patent No. 31,460, dated February 19, 1861.

*To all whom it may concern:*

Be it known that I, MYRON R. HUBBELL, of Wolcott, in the county of Lamoille and State of Vermont, have invented a new and useful Improvement in Vegetable or Root Cutters; and I do hereby declare that the following is a full, clear, and exact description of the same, reference being had to the annexed drawing, forming part of this specification, in the several figures of which similar characters of reference denote the same parts.

Figure 1 is a vertical longitudinal section of the entire machine on the line S, S, in Fig. 2 and Fig. 2 is a plan view.

My invention consists in the employment of certain knives and a platform all reciprocated by suitable means and so arranged relatively to each other and to a stationary hopper and cross bar that at each movement of the reciprocating parts a quantity of the roots in the hopper shall first descend and rest upon the platform and afterward by the return motion of the reciprocating parts be divided both vertically and horizontally in the manner hereafter more fully shown.

To enable others skilled in the art to make and use my invention I will proceed to describe its construction and operation by the aid of the drawings.

A, A, etc. are the several parts of a substantial frame work which supports my machine.

B is a frame adapted to slide longitudinally in ways $a$, $a$, provided in A.

M is a hand lever hinged to A at $m$, as represented and N is a link which connects M to B. The frame B is reciprocated by working M in a manner which is obvious.

Across the central part of B is stretched a platform $b$, which reciprocates therewith. Immediately over $b$, and in close contact therewith is a fixed bar H which is firmly secured to A and forms an abutment against the side of which the roots are successively cut. Across the ends of B are fixed two knives C and D each lying horizontally and with their edges toward the cross bar H. The edge of each is over the corresponding edge of $b$.

To the under side of $b$, are secured two series of vertical knives E and F. The edge of each knife E extends from C to $b$, and the edge of each knife F extends from D to $b$. The edges of all these knives are presented toward the cross bar H.

The height of C, D, above $b$, and the width of the space between the several knives in the series E or F should be controlled by the size to which it is desired to cut the roots. At each reciprocation of the handle M the frame B and the knives and platform attached reciprocate correspondingly, and at each extremity of the motion the edge of C or D may be brought quite in contact with H completely dividing horizontally all the roots which rest upon the platform on that side of the cross bar. The vertical knives E or F each make a corresponding cut in its respective vertical plane and the roots properly divided by the action of the knives into rectangular bars or parallelopipedons are discharged at each movement by the pressure of those cut by the next movement without a possibility of clogging the machine.

My machine is simple cheap, strong and easily kept in order.

I am aware that double-edged cutters have been reciprocated so as to cut in both directions by the same blade; also that cutters have been so mounted on disks and cylinders that one series has cut at right angles to another and has thus produced rectangular pieces. I do not claim any such devices; but,

Having now fully described my invention, what I claim as new therein and desire to secure by Letters Patent is—

The knives C, D, E, F, and platform $b$, carried in a reciprocating frame and arranged to operate in connection with the hopper G and cross bar or partition H substantially as herein set forth.

In testimony whereof I have hereunto signed my name before two subscribing witnesses.

MYRON R. HUBBELL.

Witnesses:
M. W. TERRILL,
J. M. CHATTERTON.